United States Patent [19]
Brainard

[11] 3,901,605
[45] Aug. 26, 1975

[54] APPARATUS FOR MEASURING ANGULAR POSITION

[75] Inventor: Norman R. Brainard, Flint, Mich.

[73] Assignee: General Motors Corporation, Detroit, Mich.

[22] Filed: Aug. 5, 1974

[21] Appl. No.: 494,522

[52] U.S. Cl............ 356/152; 250/231 SE; 356/150
[51] Int. Cl.²......................................... G01B 11/26
[58] Field of Search.... 250/203 R, 203 CT, 231 SE; 356/141', 152, 150, 138

[56] References Cited
UNITED STATES PATENTS
3,754,815　8/1973　Santuary et al...................... 356/152
FOREIGN PATENTS OR APPLICATIONS
1,259,961　3/1961　France............................ 250/203 R Primary Examiner—Richard A. Farley
Assistant Examiner—S. C. Buczinski
Attorney, Agent, or Firm—Warren D. Hill

[57] ABSTRACT

The angular position or the angle of deflection of a gauge pointer is measured by a cathode ray tube having a light spot moving at a fixed speed in a circular pattern, and a light detector with the gauge pointer between the light pattern and the detector. Thus the pointer prevents light from reaching the detector from one part of the circular pattern and a distinction pulse is provided at the detector output. A reference pulse corresponding to a reference point on the pattern is derived from the driving circuit of the cathode ray tube and a timing circuit measures the elapsed time between the reference pulse and the distinction pulse, thereby providing a measurement of the angle between the reference point and the position of the pointer.

3 Claims, 3 Drawing Figures

APPARATUS FOR MEASURING ANGULAR POSITION

This invention relates to an electro-optical angle measuring apparatus.

It is often desirable to determine the angular position of an element relative to some reference. For example, in calibrating gauges or meters, it is necessary to determine the position of a pointer and record the information for several different inputs to the gauge and to repeat this process for many different gauges. The process of manually reading the pointer positions is tedious and time consuming as well as being subject to human error. It is, therefore, desirable to have an apparatus for automatically measuring the angular position of a pointer and providing the resulting data in a useful form.

It is a general object of the invention to provide an apparatus for determining the angular position of an element relative to a reference.

It is a further object to provide an electro-optical apparatus for measuring the angular position of a gauge pointer relative to a reference point.

Another object is to provide an apparatus for this type which employs optical sensing of the pointer position and electronic interpretation of the angle between the pointer and a reference.

The invention is carried out by providing a cathode ray tube (CRT) and a driving circuit for providing a light spot scanning or moving in a circular pattern on the CRT, a light sensor viewing the light from the spot, and the element whose angular position is being measured being in the path of the light from the spot to the sensor to effect a sensor signal at a time corresponding to the angle of the element, and a circuit for providing a reference signal and a circuit for measuring the time between the reference signal and the sensor signal which time represents the angle between the element and a reference.

The above and other advantages will be made more apparent from the following specification taken in conjunction with the accompanying drawings wherein like reference numerals refer to like parts and wherein.

Figure 1:
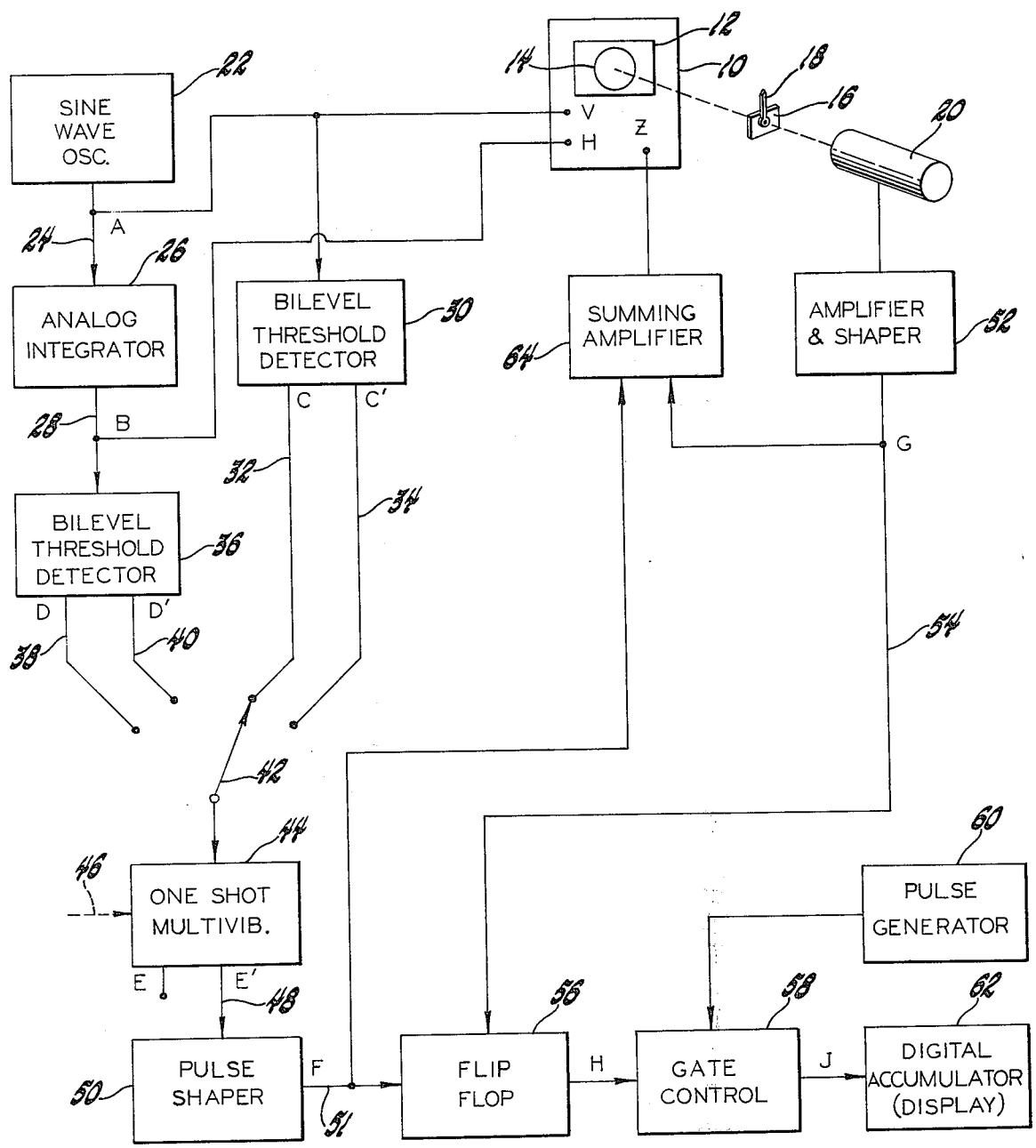
FIG. 1 is a diagrammatic illustration of the optical and electronic apparatus according to the invention.
Figure 2:
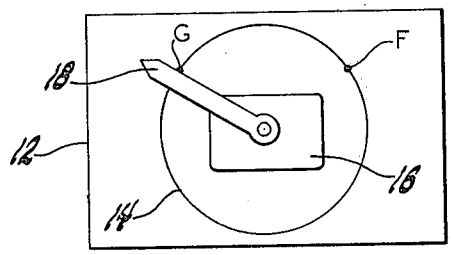
FIG. 2 is an elevational view of a portion of the optical apparatus of FIG. 1.

FIG. 1 shows an oscilloscope 10 having a cathode ray tube (CRT) 12 and a circular pattern 14 displayed on the CRT. A test gauge 16 is positioned in front of the CRT such that the gauge pointer 18 extends across the circular pattern 14. As best shown in FIG. 2, the body of the gauge 16 is small enough that it does not obstruct the circular light pattern 14. The gauge pointer 18, however, is long enough to intersect the circular pattern.

Referring again to FIG. 1, a light sensor 20 is positioned in front of the CRT so as to view the entire circular pattern 14 except for that portion obscured by the pointer 18. The light pattern 14 is, of course, formed by a light spot moved or scanned in a circular path on the CRT. Thus, as long as the light spot is visible to the light sensor 20, the electrical output of the sensor will be continuous but it will be interrupted by an extinction pulse when the light spot is obscured by the pointer 18.

Figure 3:
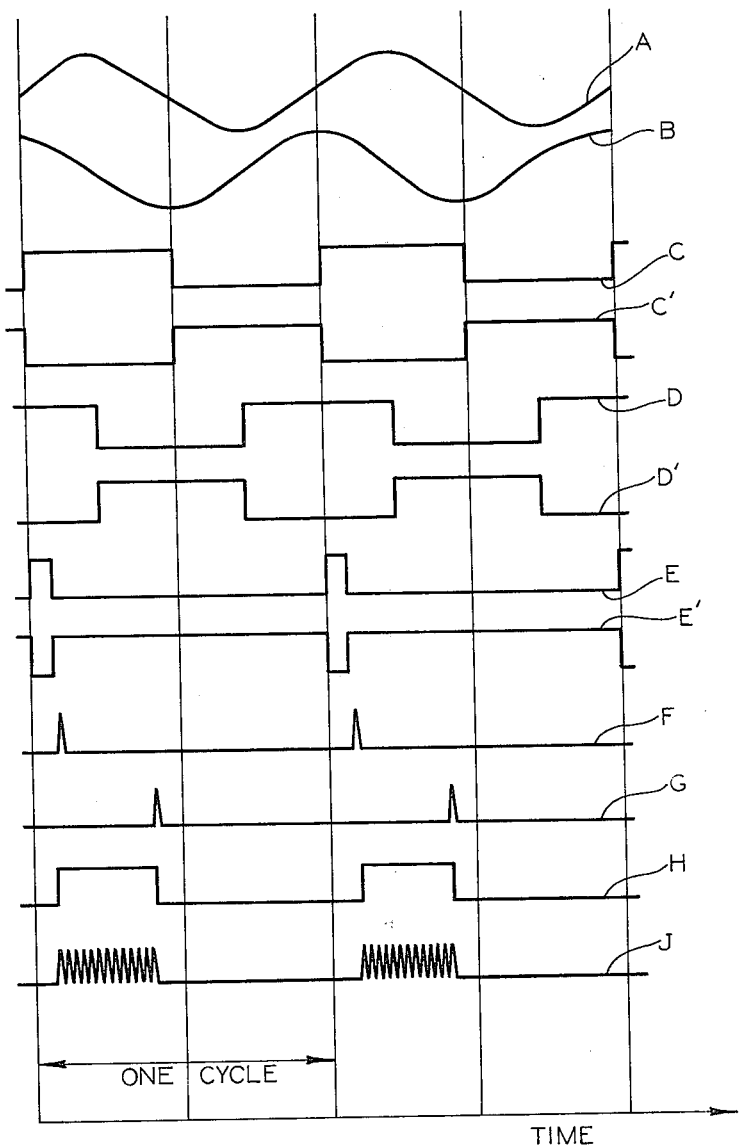
FIG. 3 is a graphical representation of several electrical signals occurring in the circuit of FIG. 1.

The motion of the light spot is controlled by a driving circuit. A sine wave oscillator 22 produces a sine wave A on line 24 which is connected to the vertical drive input terminal of the oscilloscope 10. Since wave A is fed into an analog integrator 26 which produces a cosine wave B on line 28 which is connected to the horizontal input terminal of oscilloscope 10. Thus the sine and cosine waves A and B cooperate to scan the light spot along the circular pattern 14. The signals A and B as well as other designated electrical signals are shown in graphical form in FIG. 3 to clarify the description.

A circuit is provided to produce a reference pulse occurring at a time representing some desired point on the circular pattern 14. A bi-level threshold detector 30 has its input connected to line 24. The threshold detector produces on output lines 32 and 34 signals C and C' which are complementary and which occur when the sine wave crosses a zero value in the positive going and negative going direction, respectively. A bi-level threshold detector 36 is connected at its input to the line 28 and produces on lines 38 and 40 signals D and D' which mark the zero crossover points of the cosine wave B. Thus, the rise points of the four waves C, C', D and D' are equally spaced and divide the circular pattern 14 to quadrants. A quadrant selector switch 42 selectively connects the lines 32, 34, 38 and 40 to a one-shot multivibrator 44. The multivibrator produces an output signal E upon receipt of a rising input pulse and extends for a predetermined time. The duration of the predetermined time is manually adjustable by an input 46. An output signal E' on line 48 is complementary to the signal E so that the rise time of the signal E' depends upon the position of the quadrant selector switch as well as the adjustment of the delay 46. The signal E' is fed to a pulse shaper 50 which produces on line 51 a sharp pulse F coincident with the rise of the pulse E'. That pulse F is then the reference pulse which occurs at some manually preselected portion of the circular light pattern 14.

Finally, a timing circuit is provided for measuring the angle between the reference point and the pointer 18. The output of the light sensor 20 is fed to an amplifier and shaper circuit 52 which produces an output signal on line 54 which contains the extinction pulse G occurring when the light spot becomes obscured behind the pointer 18. Line 54 is connected to the reset terminal of a flip-flop 56. The set terminal of the flip-flop is connected to receive the reference pulse F on line 51. The output H of the flip-flop controls a gate 58 which is enabled to pass pulses J from a pulse generator 60 to a digital accumulator 62. When the extinction pulse G occurs, the flip-flop is reset to disable the gate 58. Thus the digital value accumulated in the accumulator 62 represents the angular displacement of the pointer 18 from the reference point. The digital accumulator may advantageously include a display for revealing the count value. The accumulated data, since it is already in digital form, may be readily passed to a recorder, a computer, or other utilization device. The output frequency of the pulse generator 60 may be made as high as the accuracy as the apparatus requires. If the frequency of the pulse generator is 3600 times the frequency of the sweep pattern on the CRT, then the value stored by the digital accumulator can be read out directly to the nearest one-tenth degree ± one count. The repetition frequency of the circular pattern is not critical and is limited primarily by the phosphorescence time of the CRT. By using a high frequency rate of pattern repetition, however, it is possible to dynamically monitor the movement of the pointer 18, thereby obtaining data on the rate of pointer movement if desired.

The pulses F and G are fed through a summing amplifier 64 to a terminal of the oscilloscope to control the intensity of the CRT display. Thus, as indicated in FIG. 2, bright flashes will occur in the circular pattern at the points F and G corresponding to the reference point and the pointer location. This then facilitates set-up of the apparatus as well as selection of an appropriate reference point. As illustrated in the drawings, the first quadrant has been selected as an example so that the signal C on line 32 is fed to the one-shot multivibrator. The delay 46 is set for about 30° so that the signal E' and the reference pulse F occur at 30° displacement from the horizontal axis, not shown. This corresponds to the position F shown in FIG. 2 which in practice may have been selected at the zero point of the meter. Then, if the light spot moves counterclockwise, the point G represents the occurence of the extinction pulse.

It should be noted that the circuitry for selecting a reference point is very flexible in that it first allows the selection of a quadrant in which the reference point is desired and then the fine adjustment of the point within the quadrant by means of the manual adjustment 46. Where less flexibility in setting the reference point is required, then a simpler reference circuit may be used. Where a fixed reference point is desirable, then a very simple circuit for synchronizing the pulse F with some portion of the sine wave A is all that is required.

It should be recognized that use of the principle of this apparatus is not limited to measuring the angle of gauge pointers, but may be used for determining the angular position of other elements. Where the size of the gauge under test would obscure the circular light pattern 14, or the nature of the element otherwise makes it impractical to place the gauge or element in front of the CRT, then the apparatus may be modified so that the light sensor views light reflected from the pointer 18 rather than directly transmitted from the CRT. In that case the pulse G may represent a bright pulse of light reflected from the CRT via the pointer or element rather than an extinction pulse.

The embodiment of the invention described herein is for purpose of illustration and the scope of the invention is intended to be limited only by the following claims:

I claim:

1. An apparatus for determining the angular position of an element relative to a reference point comprising
    a cathode ray tube,
    driving circuitry for scanning a light spot in a circular pattern on the cathode ray tube,
    means for electrically providing a reference signal corresponding to a reference point on the circular pattern,
    means for producing an output signal when the light spot reaches the angular position of the element including, a light sensor disposed to view the light from a portion of the circular pattern, the element being disposed in the path of the light from the spot to the sensor to control the portion of the pattern viewed by the light sensor according to the angular position of the element,
    and electrical means responsive to the reference signal and the output signal for determining the angular position of the element relative to the reference point.

2. An apparatus for determining the angular position of an element relative to a reference point comprising
    a cathode ray tube,
    driving circuitry for scanning a light spot in a circular pattern at a predetermined speed on the cathode ray tube,
    means for electrically providing a reference signal corresponding in time to a reference point on the circular pattern,
    means for producing an output signal when the light spot reaches the angular position of the element including a light sensor disposed to view the light from a portion of the circular pattern, the element being disposed in the path of the light from the spot to the sensor to control the portion of the pattern viewed by the light sensor according to the angular position of the element,
    and electrical means responsive to the reference signal and the output signal for measuring the time interval between the signals and thereby determining the angular position of the element relative to the reference point.

3. An apparatus for determining the angular position of a gauge pointer relative to a reference point comprising,
    a cathode ray tube,
    driving circuitry for scanning a light spot in a circular pattern on the cathode ray tube,
    means for electrically providing a reference signal corresponding in time to a reference point on the circular pattern,
    means locating the gauge pointer in front of the cathode ray tube with the axis of the pointer concentric with the circular pattern and the pointer intersecting the pattern,
    a light sensor disposed to view the light emitted from the light spot for producing an output signal when the light spot is obscured by the pointer,
    and electrical means responsive to the reference signal and the output signal for measuring the time interval between the signals and thereby determining the angular position of the pointer relative to the reference point.

* * * * *